(12) United States Patent
Anderson et al.

(10) Patent No.: US 9,471,593 B1
(45) Date of Patent: Oct. 18, 2016

(54) METHOD AND APPARATUS FOR ENSURING CONSISTENT ORDERING OF WRITES IN A DISTRIBUTED DATABASE STORAGE SYSTEM

(75) Inventors: David Stewart Anderson, Salt Lake City, UT (US); John Timothy Olds, Sandy, UT (US)

(73) Assignee: EMC Corporation, Hopkinton, MA (US)

( * ) Notice: Subject to any disclaimer, the term of this patent is extended or adjusted under 35 U.S.C. 154(b) by 710 days.

(21) Appl. No.: 12/981,803

(22) Filed: Dec. 30, 2010

(51) Int. Cl.
*G06F 17/30* (2006.01)
(52) U.S. Cl.
CPC .............................. *G06F 17/30206* (2013.01)
(58) Field of Classification Search
CPC ................................................ G06F 17/30206
USPC ........................................................ 707/622
See application file for complete search history.

(56) References Cited

U.S. PATENT DOCUMENTS

| 7,478,400 | B1* | 1/2009 | Banerjee et al. | ............. | 719/313 |
| 2005/0160248 | A1* | 7/2005 | Yamagami | .................... | 711/170 |
| 2007/0143375 | A1* | 6/2007 | Tom et al. | .................... | 707/204 |
| 2010/0114824 | A1* | 5/2010 | Krishnaprasad et al. | .... | 707/637 |
| 2011/0225122 | A1* | 9/2011 | Denuit et al. | ................. | 707/634 |

* cited by examiner

*Primary Examiner* — Grace Park
(74) *Attorney, Agent, or Firm* — Krishnendu Gupta; Theodore Chen; Gerald P. Kazanjian

(57) ABSTRACT

Example embodiments of the present invention update copies of a file stored in a distributed storage system and provide a unique set of features, including multi-master writes, requiring a quorum response for writes, allowing multikey transactions, using an SQL relational database, and providing immediate write consistency. The method includes receiving a transaction request from a client served by the distributed storage system and requesting local priority messages from a plurality of receiver nodes in the distributed storage system. A global priority message, including a global priority value and the requested transaction, is then sent to the receiver nodes. Return codes from each receiver node are then processed to determine the status of the requested transaction at each receiver node. Other example embodiments include a method and computer program product that process a request priority message, processing a global priority message including a requested transaction and apply the requested transaction.

32 Claims, 8 Drawing Sheets

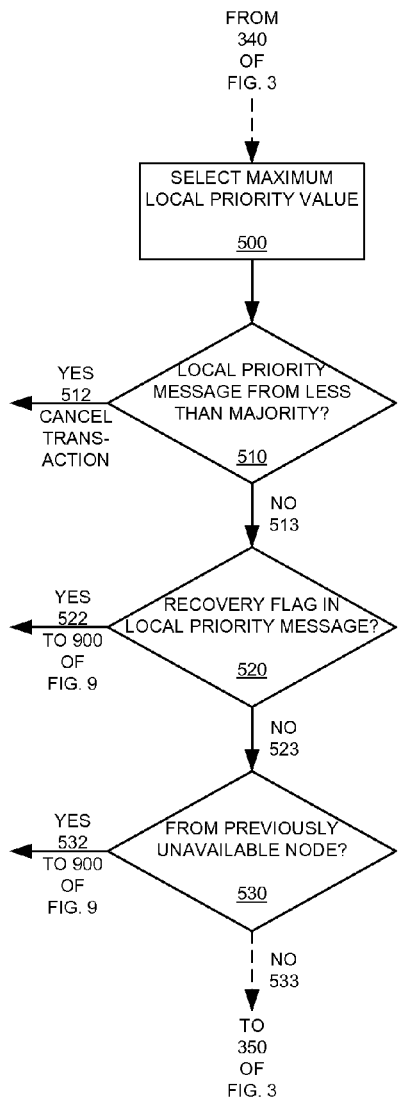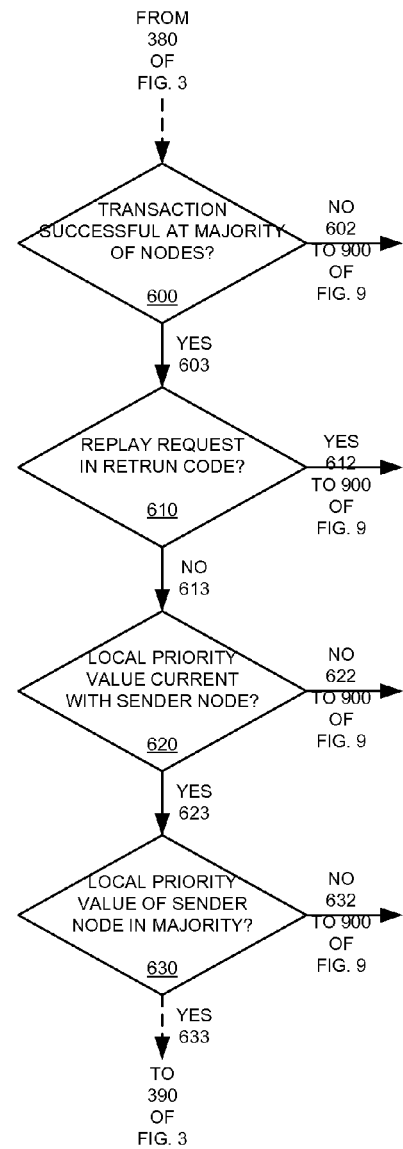
FIG. 5
FIG. 6

US 9,471,593 B1

METHOD AND APPARATUS FOR ENSURING CONSISTENT ORDERING OF WRITES IN A DISTRIBUTED DATABASE STORAGE SYSTEM

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to transactions in a distributed database storage system.

BACKGROUND

In traditional replication methodologies, such as canonical (i.e., primary/backup) replication, a client in a distributed storage system sends all edits to a single master (i.e., canonical) node. Further, in canonical replication systems, manifests (i.e., large plain text files) are stored by nodes in the distributed storage system to track files stored in the distributed storage system. For example, when a client performs a write to the distributed storage system, the manifest must be retrieved and edited to include the new file. However, manifest files typically reach several hundred megabytes in size, requiring a significant amount of processing power to parse the manifest file to make edits. Further, several weeks' worth of manifests may be retained, with frequent edits being made during that time, requiring gigabytes or even terabytes of storage.

SUMMARY

Example embodiments of the present invention relate to a method and computer program product for updating copies of a file stored in a distributed storage system. The method includes receiving a transaction request from a client served by the distributed storage system and requesting local priority messages from a plurality of receiver nodes in the distributed storage system. A global priority message, including a global priority value and the requested transaction, is then sent to the receiver nodes. Return codes from each receiver node are then processed to determine the status of the requested transaction at each receiver node. Other example embodiments include a method and computer program product that process a request priority message, processing a global priority message including a requested transaction and apply the requested transaction.

BRIEF DESCRIPTION OF THE DRAWINGS

The above and further advantages of the present invention may be better under stood by referring to the following description taken into conjunction with the accompanying drawings in which:

FIG. 3-4 are flow diagrams illustrating example methods performed by a sender node and receiver nodes, respectively, in the distributed storage system.

FIG. 5 is a flow diagram illustrating an example method performed by the sender node for processing local priority messages.

FIG. 6 is a flow diagram illustrating an example method performed by the sender node for processing return codes.

DETAILED DESCRIPTION

Figure 1:
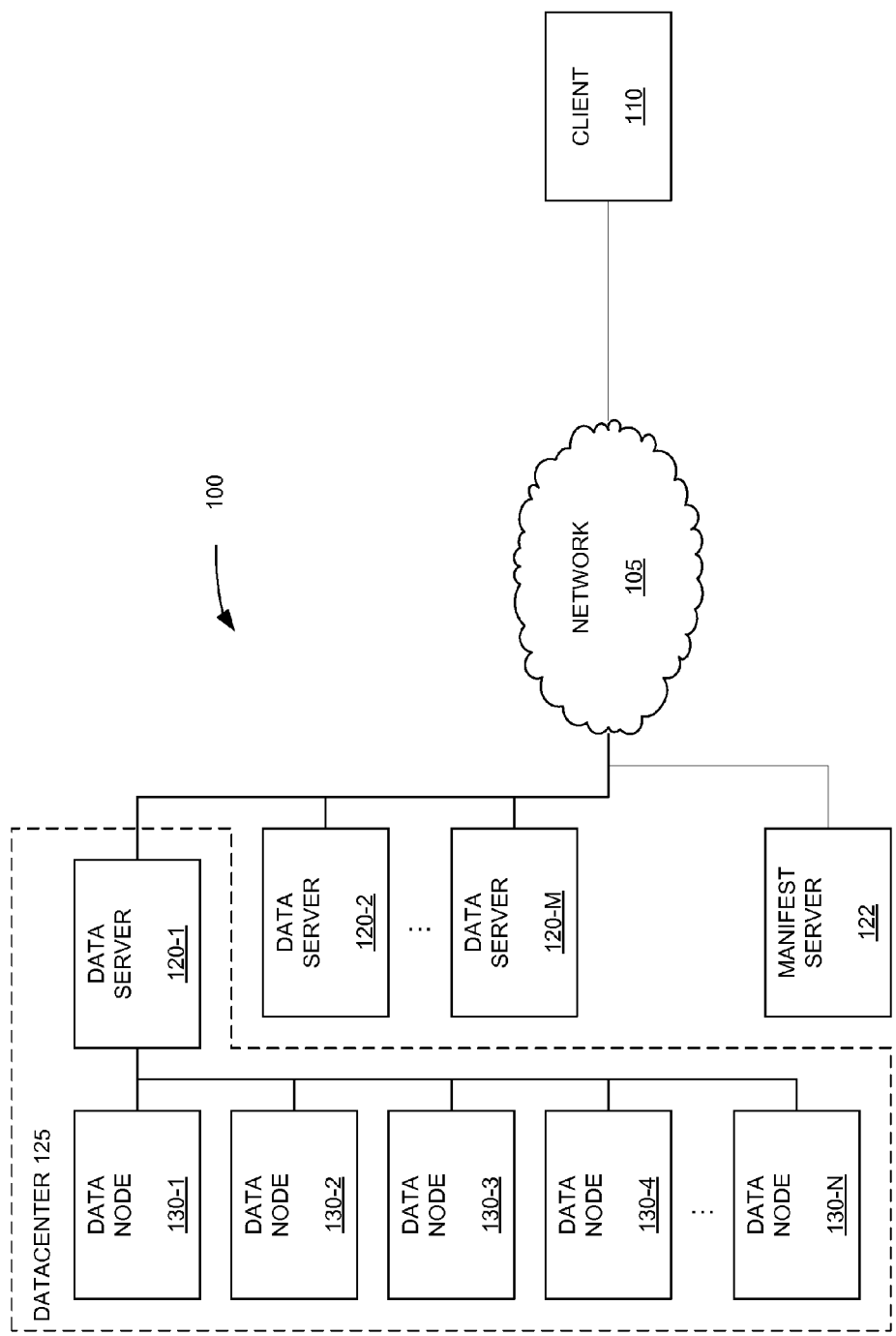
FIG. 1 is a block diagram illustrating an example distributed storage system in which example embodiments of the present invention may be employed.

Canonical replication systems present numerous problems and challenges in distributed storage systems. For example, canonical replication systems rely on centralized locking to determine the canonical node and concentrate significant processing overhead for queries on the canonical node, limiting scalability. Further, recoveries are complicated and require copying entire file replicas.

Atomic broadcast (ABCAST), developed as part of the ISIS project at Cornell University, solves many of these problems by specifying that the order in which data are received at a destination must be the same as the order at other destinations, even though this order is not determined in advance. However, in ISIS ABCAST, if there is a failure on a receiver, such as a missed global priority message, subsequent messages are undeliverable until the receiver contacts other receivers to locate the correct global priority message for an uncommitted local priority message.

Example embodiments of the present invention overcome these and other deficiencies of traditional distributed storage systems by updating copies of a file stored on three or more computers, such that a majority of computers must be responsive to complete the update, and that any computer that is not responsive at the time of the update will have its copy of the file automatically updated the next time it is responsive to an update.

Example embodiments of the present invention provide a three-phase method for updating a file stored in a distributed storage system. In the first (i.e., reservation) phase, a sender node requests local priority values (i.e., <node ID, generation value> pairs) from all receiver nodes. The receiver nodes then calculate their local priority value and send it to the sender node. The receiver nodes also reserve an entry for the transaction. In the second (i.e., commit) phase, the sender node chooses the maximum of all local priority values (i.e., <node ID, generation value> pairs) and transmits the maximum as a global priority value with the payload of a requested transaction. The receivers then receive the global priority value and the transaction, locate the entry and commit the transaction. In the third (i.e., confirmation) phase, the receivers send updated generation values and response codes to the sender node.

In example embodiments of the present invention, a distributed network protocol manages writes to a file located on a set of nodes (i.e., a view of nodes) such that all nodes contain an equivalent copy of the file (i.e., a replica) at all times. The protocol uses special control messages to ensure that, when multiple network messages arrive at nodes in the view, the writes will all be applied in a consistent order. The control messages also ensure that, if a failure is detected (e.g., either before or after a write is applied), the other replicas will help the failed node recover immediately.

In order to prevent disk corruption and maintain a consistency across the view, failed receiver nodes are atomically removed from the view. Likewise, new receiver nodes are atomically added to the view, and recovered receiver nodes are automatically detected and updated in the view. Further, receiver nodes automatically reject updates in which a record of the active view contained in the update message contains a host that the receiver node's record of the view indicates is offline. Moreover, the use of the global priority value prevents race conditions. The view is atomically written to stable storage on all receiver nodes, thereby preventing corruption resulting from node reboot.

Further, example embodiments of the present invention allow edits to proceed if a majority of nodes are responsive to the request priority message, thereby enabling the view to continue accepting edits even when a node is down. This stands in direct contrast to ISIS ABCast which requires a response from all nodes in the view because every node must have a local priority entry for the edit.

Moreover, example embodiments of the present invention use in-memory storage of local priority and global priority edit records, instead of storing the edit list on stable storage. This reduces disk load on the nodes and eliminates the need to delete completed edits from disk. In contrast, ISIS ABCast cannot use in-memory storage because of the risk of reboot and because it does not maintain a generation value on disk.

Additionally, example embodiments of the present invention enable a node that has been down to recover and rejoin the view even if it has completely missed one or more updates. This stands in direct contrast to ISIS ABCast which does not provide for node recovery in the case of missed edits because its recovery methodology is based on scanning for undelivered edits on the down node's disk.

In example embodiments of the present invention, there is no need for the client to coordinate sending read and write messages only to a canonical node. Rather, the client may send read and write messages to any node in the view at any time, thereby removing latency of up to 10 seconds per edit in comparison to traditional canonical implementations.

Example embodiments of the present invention also detect that a replica has rejoined the view before sending edits to it, thereby preventing time-consuming block copies that result from database corruption.

FIG. 1 is a block diagram illustrating an example distributed storage system 100 in which example embodiments of the present invention may be employed. The example environment 100 includes a plurality of data servers 120-1-120-M (120, generally), a manifest server 122, and a plurality of data nodes 130-1-130-N (130, generally) and a client 110 for distributively storing files in the distributed storage system over a network 105, such as the Internet or an intranet. The storage nodes 130 and their respective data server 120-1 may be in a datacenter 125. However, it should be noted that, in alternate embodiments, the data server 120-1 may be located outside of the datacenter 125 or the data server 120-1 may serve data nodes 130 in multiple different datacenters 125. Further, the file may be SQL database, such as that employed by SQLite.

Figure 2A:
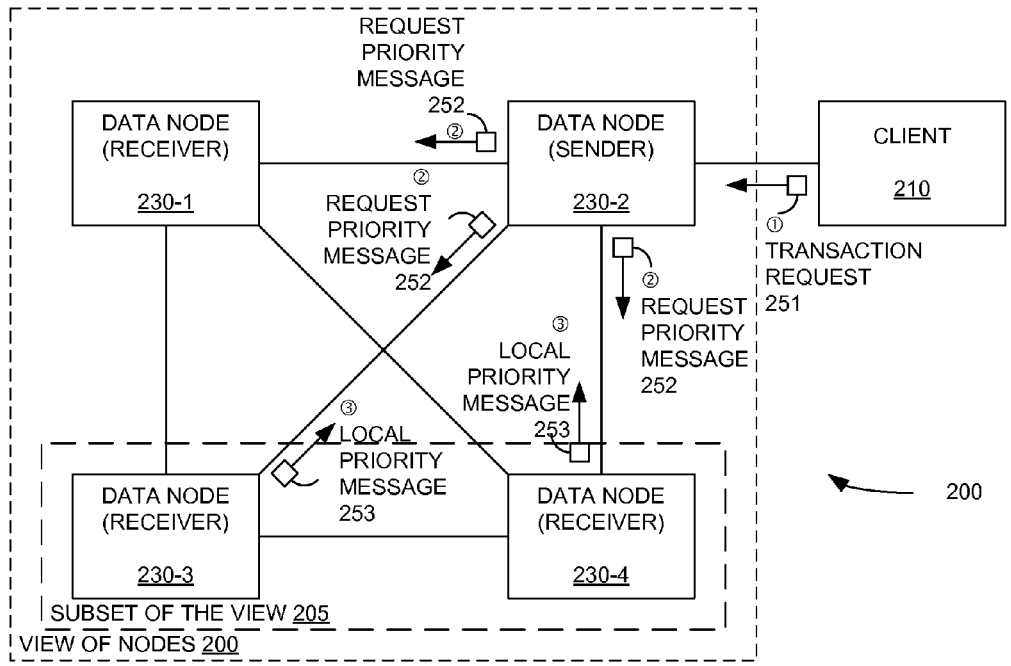
FIGS. 2A-2B are block diagrams illustrating a view of a plurality of four nodes in the distributed storage system.
Figure 2B:
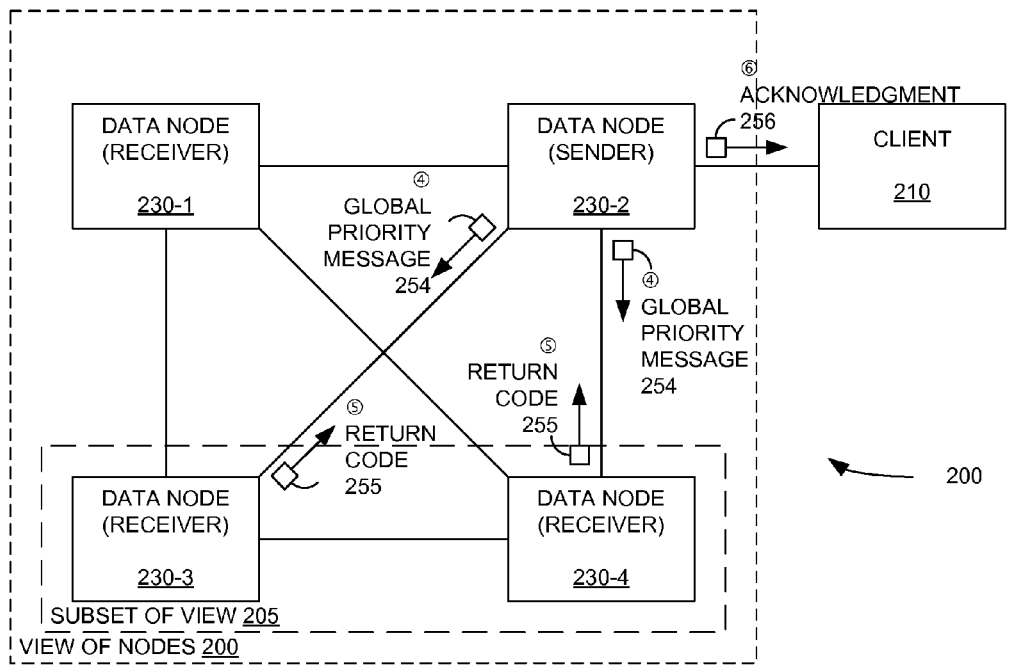

FIGS. 2A-2B are block diagrams illustrating a view 200 of a plurality of four nodes 230-1-230-4 (e.g., data nodes 130 of FIG. 1) in a distributed storage system 200. FIGS. 2A-2B may be read in conjunction with the flow diagrams of FIGS. 3-11.

As illustrated in FIG. 2A, a client 210 sends a transaction request 251 to the plurality of four nodes 230-1-230-4 in the view 200. It should be understood that the client 210 may be assigned to a view of nodes selected from the nodes available at a datacenter.

First (i.e., Reservation) Phase

Figure 3:
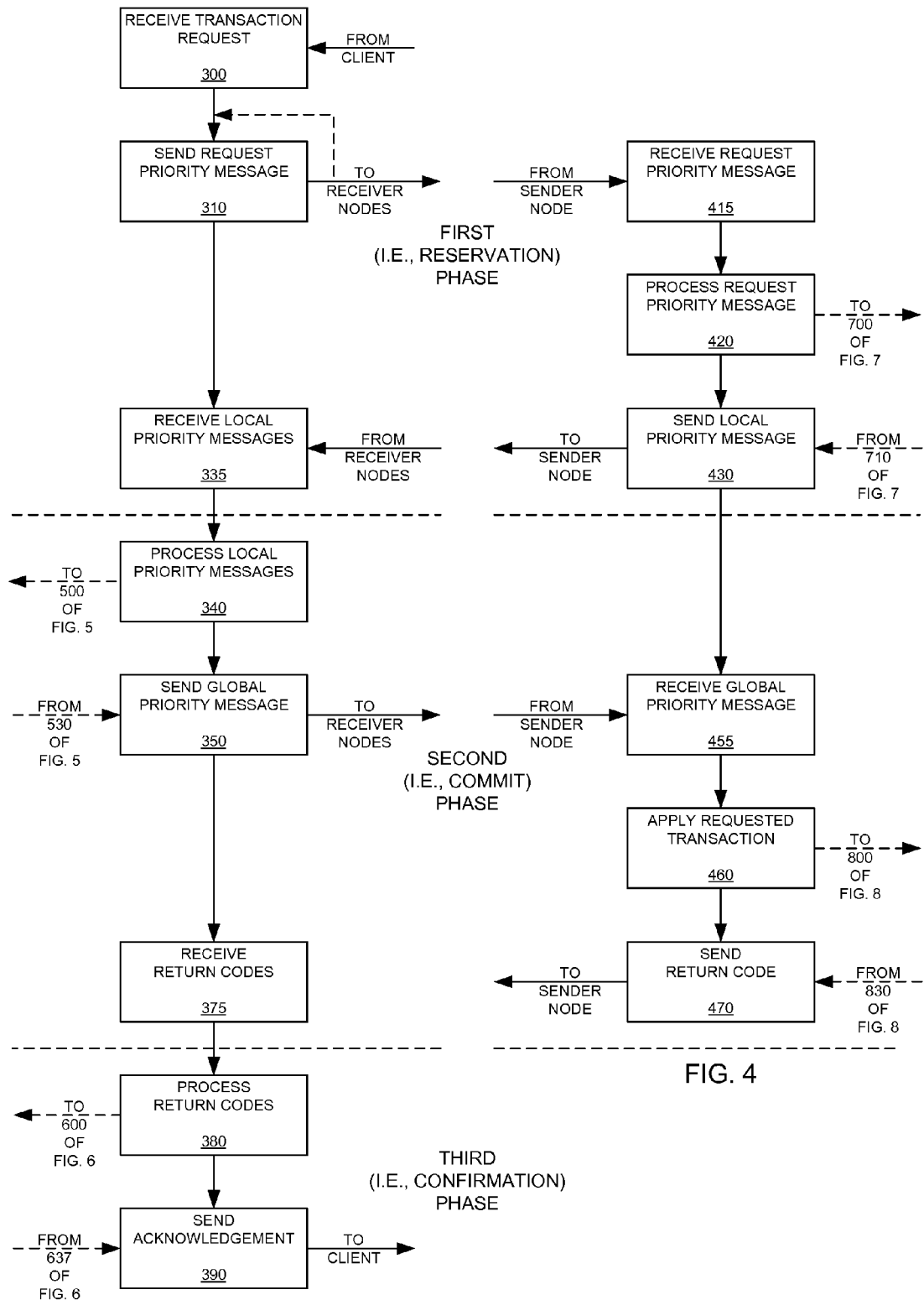

In conjunction with FIG. 3, a sender node 230-2 in the view 200 receives the transaction request 251 (300) for a file from the client. The sender node 230-2 then sends a request priority message 252 (310) to each receiver node 230-1, 230-3, 230-4 in a set of receiver nodes for a local priority value associated with the file at the respective receiver node 230-1, 230-3, 230-4. It should be understood that the sender node 230-2 may be selected randomly from the view 200 of nodes and that the receiver nodes 230-1, 230-3, 230-4 are then determined to be the nodes 230 in the view 200 other than the sender node 230-2.

As illustrated in FIG. 4, the receiver nodes 230-1, 230-3, 230-4 then receive the request priority message 253 (415) from the sender node 230-2 and process the request priority message 253 (420).

Figure 7:
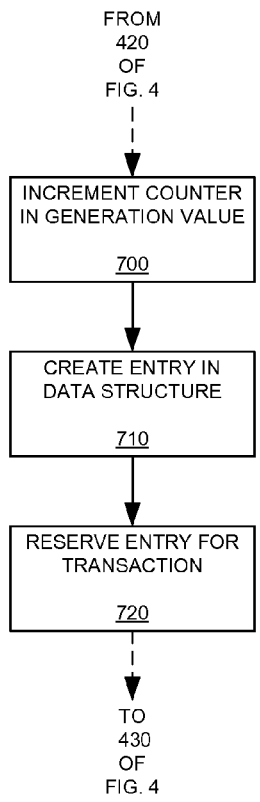
FIG. 7 is a flow diagram illustrating an example method performed by the receiver nodes for processing request priority messages.

In certain embodiments, as illustrated in FIG. 7, to process the request priority message 253 (420), the receiver nodes 230-1, 230-3, 230-4 increment their generation values (i.e., counters) to exceed the highest generation value the node has received, which allows the receiver nodes 230-1, 230-3, 230-4 to distinguish among multiple edits that may be active at the same time. The receiver nodes 230-1, 230-3, 230-4 also create an entry in a data structure referenced by a local priority value included in the request priority message 253 (710) and reserve the entry for the transaction (720). The receiver nodes generate the two-part local priority by combining the node's unique identifier and the generation value of the replicated file. Each generation value may include an incremented count of transactions processed at the node 230 and an identifier of the state of the file stored at the node (e.g., a hash of the file and the transactions performed on the file). The receiver node increments the generation value counter for each local priority it reserves. However, it does not commit the updated generation value to disk until the commit phase, when the sender has finalized the new counter value (global priority).

Returning to FIG. 4, the receiver nodes 230-1, 230-3, 230-4 then send respective local priority messages 253 (430), including a local priority value, to the sender node 230-2. As illustrated in FIG. 3, the sender node 230-2 then receives the local priority messages 253 (335) from a subset 205 of the receiver nodes 230-1, 230-3, 230-4 in the view 200. It should be noted that the subset may include none, some or all of the receiver nodes 230-1, 230-3, 230-4 in the view 200. As illustrated in FIG. 2A, the subset 205 includes two receiver nodes 230-3, 230-4.

Second (i.e., Commit) Phase

The sender node 230-2 then processes the local priority messages 253 (340). First, the sender node 230-2 selects the maximum local priority value (500) received in the local priority messages 253 as a global priority value. Next, in certain embodiments, as illustrated in FIG. 5, the sender node 230-2 determines whether local priority messages 253 were received from less than a majority of the receiver nodes 230-1, 230-3, 230-4 in the view 200 (510). This requirement that a quorum of nodes respond allows example embodiments of the present invention to proceed even if some nodes (i.e., a minority of nodes) will end up failing in the transaction. If local priority messages 253 were received from less than a majority of the nodes 230 in the view 200 (512), the transaction is cancelled. However, as illustrated in FIG. 2A, local priority messages 253 were received from two receiver nodes 230-3, 230-4 (i.e., two nodes is not less than a majority of four nodes). Further, it should be understood that, in certain embodiments, the sender node may behave as both a sender node and a receiver node so that the sender node "receives" a local priority message 253 from itself by simulating sending a request priority message 252 so that the set of receiver nodes includes the sender node 230-2. Accordingly, if local priority messages 253 were received from at least a majority of the nodes 230 in the view 200 (513), the method continues to determine whether a recovery flag is set in the local priority message (520).

The sender node 230-2 then determines whether a recovery flag is set in a local priority message 253 (520) to indicate a receiver node 230-1, 230-3, 230-4 requires recovery. If a recovery flag is set (522), the sender node 230-2 performs a recovery routine set out in FIG. 9. If no recovery flag is set (523), the sender node 230-2 determines whether a local priority message 253 was received from a node previously unavailable in the view (530). If a local priority message 253 was received from a node previously unavailable in the view (532), the sender node 230-2 performs a recovery routine set out in FIG. 9. However, if a local priority message 253 was not received from a node previously unavailable in the view (523), the sender node 230-2 selects the maximum local priority value (530) received in the local priority messages 253 as a global priority value. The random assignment of a transaction and the determination of a global priority value allow example embodiments of the present invention to not be locked to one canonical node and employ a "multi-master" methodology in which any one of the nodes in the view may operate as a master node.

It should be noted that, if the sender node 230-2 detects one of the conditions set forth above (e.g., less than a majority (510), recovery flag (520) or unavailable node (530)) the sender node 230-2 still proceeds through the commit phase of the protocol. Otherwise, the receivers nodes 230-1, 230-3, 230-4 would timeout waiting for a global priority message.

As illustrated in FIG. 2B and returning to FIG. 3, the sender node 230-2 then sends a global priority message 254 to the receiver nodes from which local priority messages 253 were received (i.e., the receiver nodes 230-3, 230-4 in the subset of the view 205) (350). Sending the global priority message (350) may also include sending an identification of the nodes 230 in the view 200 and the availability status of each receiver node 230-1, 230-3, 230-4 in the view (i.e., receiver node 230-1 will be indicated as not available because it failed to return a local priority message 253, and receiver nodes 230-3, 230-4 will be indicated as available).

Turing to FIG. 4, the receiver nodes 230-3, 230-4 in the subset of the view 205 then process the global priority message 254 by receiving the global priority message 254 (455) from the sender node 230-2 and updating their local priority value to equal a global priority value included in the global priority message 254.

Figure 8:
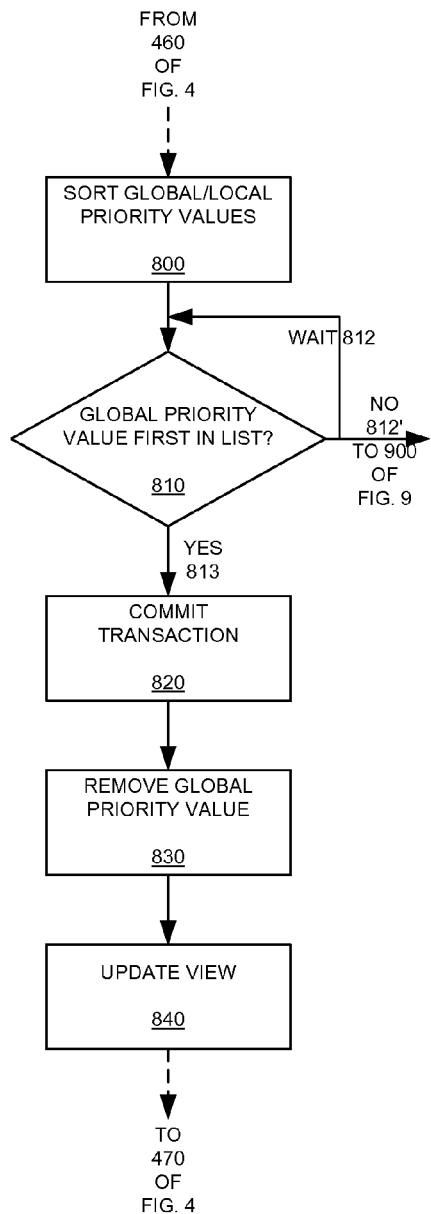
FIG. 8 is a flow diagram illustrating an example method performed by the receiver nodes for applying a requested transaction.

As illustrated in FIG. 4 and turning to FIG. 8, in a preferred embodiment, the receiver nodes 230-3, 230-4 then apply the requested transaction (460) by sorting the global priority values and local priority values (800) in a list. The receiver nodes 230-3, 230-4 then determine whether a global priority value is first in the list (810). If a global priority value is not first in the list or no entry in the list includes a global priority value, the receiver node 230-3, 230-4 waits a specified period of time to receive a global priority value (812) and sets a recovery trigger if no global priority value is received during the specified period of time (812').

However, if a global priority value is first in the list (813), the receiver nodes 230-3, 230-4 commit the requested transaction (820) and save the updated generation value and updated identifier (i.e., hash) to disk. The receiver nodes 230-3, 230-4 then remove the global priority value from the list (830) and update a local view of nodes according to an updated identification of the nodes in the view 200 and the availability status of each receiver node included in the global priority message (840) (e.g., receiver node 230-1 will be updated as no longer in the view so that, if a local priority message 253 is later received from receiver node 230-1, a recovery flag may be set so receiver node 230-1 can be recovered). Returning to FIG. 4, the receiver nodes 230-3, 230-4 then send a return code 255 indicative of success or failure of the transaction at the receiver node 230-3, 230-4 to the sender node 230-2 (470). The return code 255 may include an updated generation value generated by incrementing the counter in the generation value and calculating the identifier according to the file and the transaction performed on the file. Returning to FIG. 3, the sender node 230-2 then receives a respective return code 255 from each receiver node 230-3, 230-4 (375) indicative of success of the transaction at the respective receiver node 230-3, 230-4.

Third (i.e., Confirmation) Phase

The sender node 230-2 then processes the return codes (380) to determine the status of the requested transaction at each node in the view 200 and sends an acknowledgement to the client 210 (390) indicating success of the update to the file stored in the distributed storage system (e.g., distributed storage system 100 of FIG. 1) according to the processed return codes 255.

Turing to FIG. 6, to process the return codes from each receiver node 230-3, 230-4 to determine the status of the requested transaction at each receiver node 230-3., 230-4, the sender node 230-2 determines whether the requested transaction succeeded at all of the receiver nodes 230-3, 230-4 in the subset of the view 205 (600). If the requested transaction did not succeed at all of the receiver nodes 230-3, 230-4 in the subset of the view 205 (602), the sender node 230-2 performs a recovery routine set out in FIG. 9.

However, if the requested transaction did succeed at all of the receiver nodes 230-3, 230-4 in the subset of the view 205 (603), the sender node 230-2 determines whether a replay request was included in a return code 255 (610) including the generation value associated with the file at the receiver node 230-3, 230-4 that sent the return code 255 including the replay request. If a return code 255 did include a replay request (612), the sender node 230-2 performs a recovery routine set out in FIG. 9.

However, if a return code 255 did not include a replay request (613), the sender node 230-2 determines whether a generation value included in a return code 255 indicates that a receiver node 230-3, 230-4 is not current when compared to the sender node 230-2 (620). To check the generation value of a receiver, the sender compares both the counter and identifier (e.g. hash) portions of the receiver's generation value against the counter and identifier in the sender's generation value. If a receiver node 230-3, 230-4 is not current (622), the sender node 230-2 performs a recovery routine set out in FIG. 9.

However, if the receiver node 230-3, 230-4 is current (623), the sender node 230-2 determines whether its generation value is in a majority of generation values among the sender node 230-2 and the receiver nodes 230-3, 230-4 in the subset of the view 205 (630). If the generation value of the sender node 230-2 is not in the majority of generation values (632), the sender node 230-2 performs a recovery routine set out in FIG. 9. However, if the generation value of the sender node 230-2 is in the majority of generation values (633), the sender node 230-2 then sends an acknowledgement 256 to the client 210 (390) indicating success of the update to the file stored in the distributed storage system.

Figure 9:
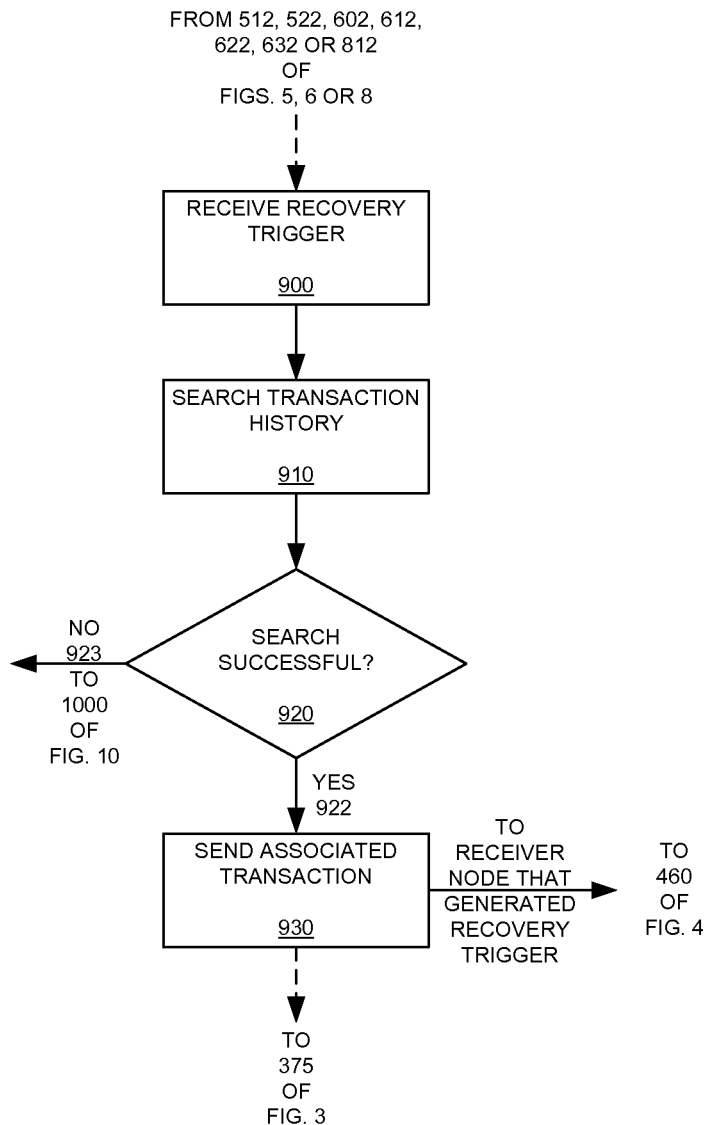
FIG. 9 is a flow diagram illustrating a recovery routine that may be triggered by various recovery triggers of FIG. 5, 6 or 8.

The recovery routine illustrated in FIG. 9 may be triggered by various received recovery triggers (900). Example embodiments of the present invention employ two kinds of recovery: first-chance recovery, which avoids unnecessary corruption, and second-chance recovery, which handles write errors. First chance recovery starts when a sender node 230-2 receives a recovery flag set in a local priority message (512) or receives a local priority message from a previously unavailable node 230-1 (522). Based on whether the transaction corresponding to the local priority value is still available in system memory, the newly rejoined receiver node may get caught up using the recovery protocol illustrated in FIG. 9. Likewise, if the newly rejoined receiver node 230-1 is too far out of date, a block copy may be performed to recover the node, as illustrated in FIG. 9.

Second chance recovery starts when a sender node 230-2 determines that a transaction was not successful at a majority of nodes 230 (602), detects a replay request in a return code (612), determines that the local priority value of a receiver node 230-1, 230-3, 230-4 is not current with the sender node 230-2 (622), determines that the local priority value of the sender node 230-2 is not in a majority (632) or determines that a global priority value is not first in the list of sorted priority values (812).

The sender node 230-2 then searches its transaction history (910) for a transaction associated with the generation value included in the recovery trigger and determines whether the search was successful (920). If the search was successful (922), the sender node 230-2 sends the associated transaction from the transaction history to the receiver node 230-1, 230-3, 230-4 that generated the recovery trigger (930). Accordingly, the node that generated the recovery trigger receives and processes the transaction such that the sender node 230-2 receives a return code (375) from the node that generated the recovery trigger.

Figure 10:
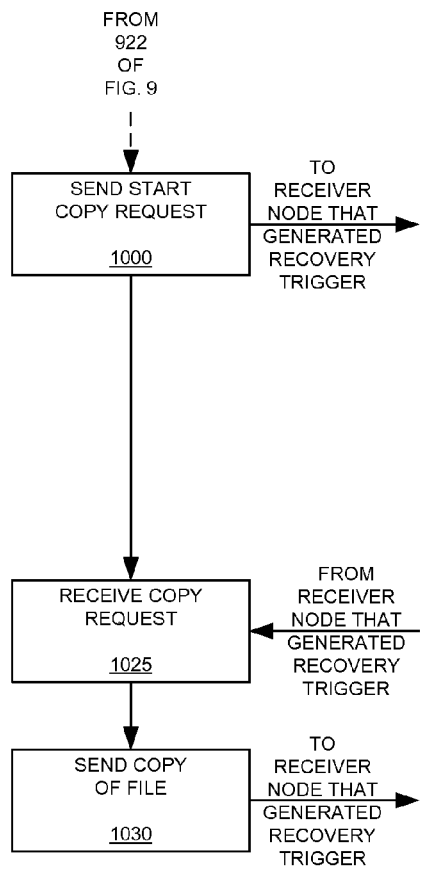
FIGS. 10 and 11 are flow diagrams illustrating a portion of the recovery routine of FIG. 9 in which a file is copied from the sender node to a receiver node requesting the file.
Figure 11:
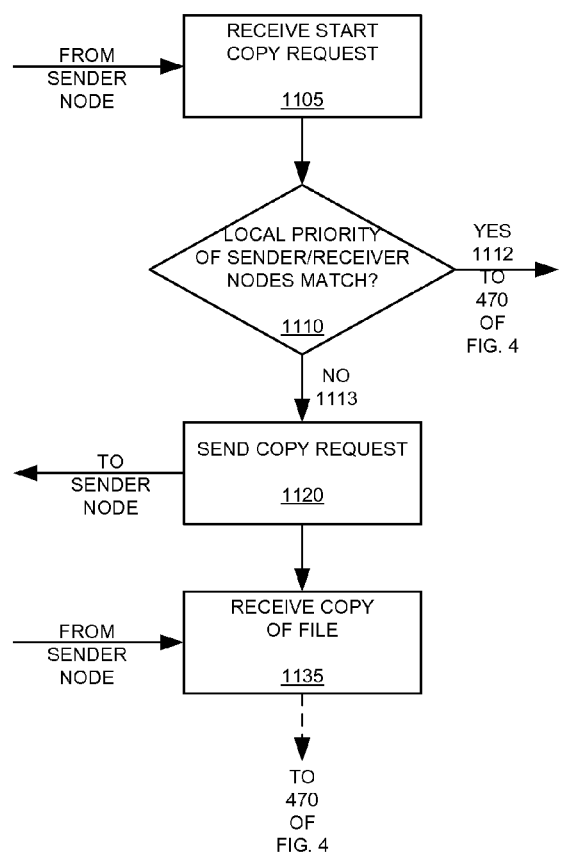

However, turning to FIGS. 10 and 11, if searching the transaction history (910) for a transaction associated with the generation value included in the recovery trigger fails (923), indicating that the receiver node that sent the recovery trigger is current or is too far out of date to be recovered by transactions stored in a recovery cache of a sender node 230-2, or if a replay request is included in a return code (612), the sender node 230-2 sends a start copy request to the receiver node that generated the recovery trigger 230-1, 230-3, 230-4 (1000) to initiate copying the file to the receiver node that generated the recovery trigger 230-1, 230-3, 230-4. The receiver node 230-1, 230-3, 230-4 then receives the start copy request (1105) including the generation value of the sender node 230-2 to initiate copying the file from the sender node 230-2.

The receiver node 230-1, 230-3, 230-4 then determines whether the generation values of the sender node 230-2 and the receiver node 230-1, 230-3, 230-4 match (1110). If the generation values of the sender node 230-2 and receiver node 230-1, 230-3, 230-4 match (1112), the receiver node 230-1, 230-3, 230-4 sends a return code (470) as illustrated in FIG. 4. However, if the generation values of the sender node 230-2 and the receiver node 230-1, 230-3, 230-4 do not match (1113), the receiver node 230-1, 230-3, 230-4 sends a copy request (1120) to the sender node 230-2. The sender node 230-2 then receives the copy request (1025) from the receiver node that generated the recovery trigger 230-1, 230-3, 230-4 and sends a copy of the file (1030) to the receiver node that generated the recovery trigger 230-1, 230-3, 230-4. The receiver node that generated the recovery trigger 230-1, 230-3, 230-4 then receives the copy of the file from the sender node 230-2 (1135) and sends a return code (470).

Figure 12:
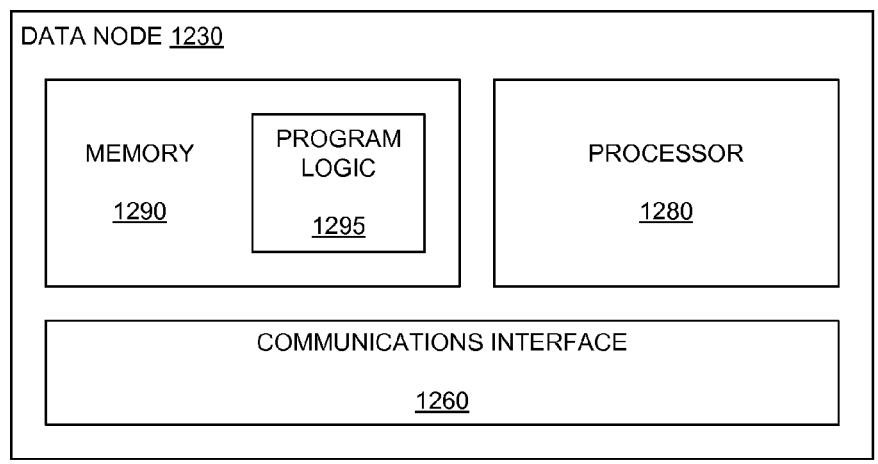
FIG. 12 is a block diagram illustrating an example embodiment data node.

FIG. 12 is a block diagram illustrating a data node 1210 including a communications interface 1260, a processor 1280 and memory 1290 storing program code 1295. The methods and apparatus of this invention may take the form, at least partially, of program logic (i.e., instructions) embodied in tangible non-transitory media, such as floppy diskettes, CD-ROMs, hard drives, random access or read only-memory, or any other machine-readable storage medium 1290. When the program logic is loaded into and executed by a machine, such as the data node 1210 of FIG. 12, the machine becomes an apparatus for practicing the invention. When implemented on one or more general-purpose processors 1280, the program logic 1295 combines with such a processor 1280 to provide a unique apparatus that operates analogously to specific logic circuits. As such a general purpose digital machine can be transformed into a special purpose digital machine.

Figure 13:
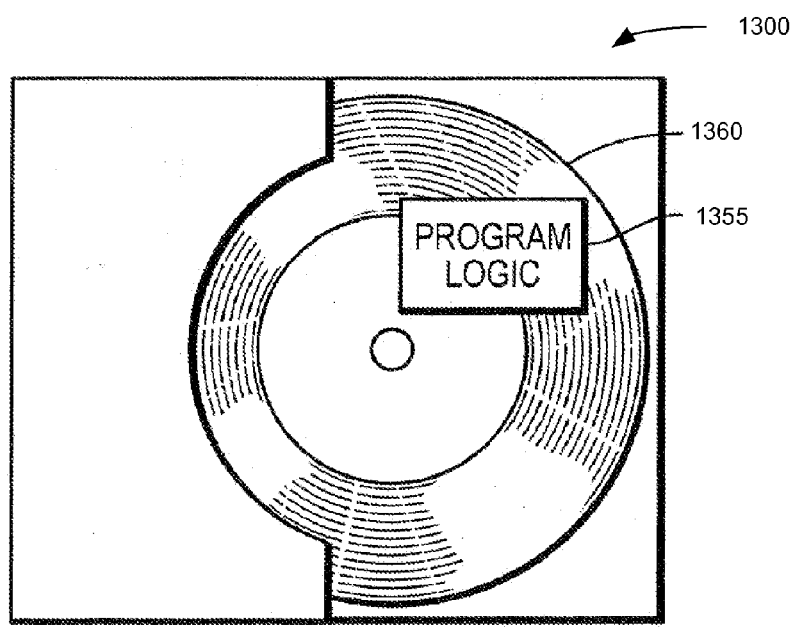
FIG. 13 is a diagram illustrating an example embodiment method of the present invention embodied as program code or a program product.

FIG. 13 shows Program Logic 1355 embodied on a computer-readable medium 1330 as shown, and wherein the Logic is encoded in computer-executable code configured for carrying out the reservation service process of this invention and thereby forming a Computer Program Product 1300.

The logic for carrying out the method may be embodied as part of the aforementioned system, which is useful for carrying out a method described with reference to embodiments shown in, for example, FIGS. 2-11. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method of managing a distributed storage system comprising a plurality of data nodes each enabled to be at respective times either a receiver node or a sender node, the method comprising:
   designating a state of a first data node among the plurality of data nodes as the sender node as controlled by receipt by the first data node of a transaction request from a client relating to a file stored in the distributed storage system;
   sending respective requests from the sender node to each data node of the plurality of data nodes other than the first data node as a receiver node for a local priority message comprising an identifier (ID) for the receiver node and a generation value indicative of a version number of the file as stored on the receiver node;
   determining, at the sender node, a global priority value for the requested file as a maximum generation value among the generation values received in the local priority messages received from the receiver nodes and indicative of a most up-to-date version of the file as stored among the nodes in the distributed storage system;
   sending a global priority message, including the global priority value and the requested transaction, to each receiver node from which the sender node received a local priority message, the global priority message for processing at each receiver node to update copies of the file stored in the distributed storage system by applying the requested transaction and incrementing a generation value counter for the file to indicate a new most up-to-date generation of the file as stored in the distributed storage system; and
   processing return codes received from the receiver nodes to determine a respective status of the requested transaction at each receiver node.

2. The method of claim 1 wherein requesting a local priority message from each receiver node in a view of the plurality of data nodes comprises simulating sending a request priority message to the sender node.

3. The method of claim 1 wherein the sender node receives a local priority message from a subset of the view of the plurality of data nodes; and
   wherein sending a global priority message, including the global priority value and the requested transaction, to each receiver node comprises sending the global priority message to each receiver node in the subset of the view of the plurality of data nodes.

4. The method of claim 3 wherein sending the global priority message to each receiver node in the subset of the view of the plurality of data nodes comprises
   sending an identification of the nodes in the view and the availability status of each receiver node; and
   wherein sending a global priority message comprises:
   cancelling the requested transaction if a number of receiver nodes in the subset of receiver nodes is less than a majority of the number of receiver nodes;
   setting a recovery trigger if a recovery flag is set in a received local priority message to indicate that receiver node requires recovery; and
   setting the recovery trigger if a local priority message was received from a receiver node previously unavailable among the receiver nodes.

5. The method of claim 1 wherein processing return codes from each receiver node to determine a respective status of the requested transaction at each receiver node comprises:
   receiving a respective return code from each receiver node in a subset of the view of the plurality of data nodes indicative of success of the transaction at the respective receiver node;
   processing the return codes to determine the status of the requested transaction at each receiver node in the subset of the view; and
   sending an acknowledgement to the client indicating success of the update to the file stored in the distributed storage system according to the processed return codes.

6. The method of claim 5 wherein processing the return codes to determine the status of the requested transaction at each receiver node in the subset of the view comprises:
   setting a recovery trigger if the return codes indicate the requested transaction did not succeed at all of the receiver nodes in the subset of the view;
   setting the recovery trigger if a replay request is included in a return code, including a generation value associated with the file at the receiver node that sent the return code;
   setting the recovery trigger if the generation value included in the return code indicates the receiver node is not current when compared to the sender node and the sender node is in a majority of generation values; and
   setting the recovery trigger if the generation value of the sender node is not in a majority of generation values.

7. The method of claim 1 further comprising:
   detecting a recovery trigger including a generation value for a receiver node that generated the recovery trigger;
   searching a transaction history for a transaction associated with the generation value included in the recovery trigger; and
   sending the associated transaction from the transaction history to the receiver node that generated the recovery trigger if the search succeeds.

8. The method of claim 7 wherein each generation value includes an incremented count of transactions processed at the respective receiver node and an identifier of the state of the file stored at the receiver node.

9. The method of claim 7 wherein searching a transaction history for a transaction associated with the generation value included in the recovery trigger fails, indicating that the receiver node is current or is too far out of date to be recovered by transactions stored in a recovery cache of a sender node in the view, and wherein a replay request is included in a return code, the method further comprising:
   sending a start copy request to the receiver node that generated the recovery trigger to initiate copying the file to the receiver node that generated the recovery trigger;
   receiving an acknowledgment to the start copy request from the receiver node that generated the recovery trigger; and
   sending the file to the receiver node that generated the recovery trigger.

10. A method of managing a distributed storage system comprising a plurality of data nodes each enabled to be at respective times either a receiver node or a sender node, the method comprising:
    receiving, at a data node as a receiver node, a request from a sender node for a local priority message comprising an identifier (ID) for the receiver node and a generation value indicative of a version number of the file as stored on the receiver node;

designating a state of a the data node as a receiver node as controlled by the receipt at the data node of the request from the sender node for the local priority message, the sender node designated as the sender node as controlled by receipt by the sender node of a transaction request from a client relating to a file stored in the distributed storage system;

sending the local priority message to the sender node;

receiving a global priority message from the sender node, including the requested transaction and a global priority value determined at the sender node as a maximum generation value among the generation values received in the local priority messages received from the receiver nodes and indicative of a most up-to-date version of the file as stored among the nodes in the distributed storage system;

processing the global priority message to update copies of the file stored in the distributed storage system by applying the requested transaction and incrementing a generation value counter for the file to indicate a new most up-to-date generation of the file as stored in the distributed storage system; and sending a return code to the sender node indicative of a status of the requested transaction at the receiver node.

11. The method of claim 10 wherein receiving, at a data node as a receiver node, a request from a sender node for a local priority message comprises:

receiving the request priority message for a local priority value associated with the file;

incrementing a counter in a generation value;

creating an entry in a data structure referenced by a local priority in the generation value;

reserving the entry for the requested transaction; and sending a local priority message, including the local priority value, to the sender node.

12. The method of claim 10 wherein processing a global priority message including the requested transaction comprises updating the local priority value to equal the global priority value and setting its type to global; and wherein applying the requested transaction comprises sending a return code indicative of success of the transaction to the sender node.

13. The method of claim 12 wherein applying the requested transaction further comprises:

sorting received global priority values and local priority values in a list;

if the first entry in the list includes a local priority value or no entry in the list includes a global priority value, waiting a specified period of time to receive a global priority value; and setting a recovery trigger if no global priority value is received during the specified period of time; and if the first entry in the list includes a global priority value, committing the requested transaction;

removing the global priority value from the list; and updating a local view of nodes among a plurality of nodes in the distributed storage system according to an updated identification of the nodes in the view and the availability status of each receiver node included in the global priority message.

14. The method of claim 13 wherein each generation value includes an incremented count of processed transactions and an identifier of the state of the file and wherein sending a return code indicative of success of the transaction to the sender node comprises:

generating an updated generation value by calculating the identifier; and including the updated generation value in the return code.

15. The method of claim 10 further comprising:

receiving a start copy request, including the generation value of the sender node, to initiate copying the file from the sender node;

sending a return code if the generation value of the sender node matches the generation value of a receiver node in the view performing the method;

sending a copy request to the sender node if the generation value of the sender node does not match the generation value of the receiver node; and receiving a copy of the file from the sender node.

16. A computer program product having a non-transitory computer readable storage medium operable to store computer program logic embodied in computer program code encoded thereon for managing a distributed storage system comprising a plurality of data nodes each enabled to be at respective times either a receiver node or a sender node, the computer program code comprising:

computer program code for designating a state of a first data node among the plurality of data nodes as the sender node as controlled by receipt by the first data node of a transaction request from a client relating to a file stored in the distributed storage system;

computer program code for sending respective requests from the sender node to each data node of the plurality of data nodes other than the first data node as a receiver node for a local priority message comprising an identifier (ID) for the receiver node and a generation value indicative of a version number of the file as stored on the receiver node;

computer program code for determining, at the sender node, a global priority value for the requested file as a maximum generation value among the generation values received in the local priority messages received from the receiver nodes and indicative of a most up-to-date version of the file as stored among the nodes in the distributed storage system;

computer program code for sending a global priority message, including the global priority value and the requested transaction, to each receiver node from which the sender node received a local priority message, the global priority message for processing at each receiver node to update copies of the file stored in the distributed storage system by applying the requested transaction and incrementing a generation value counter for the file to indicate a new most up-to-date generation of the file as stored in the distributed storage system; and computer program code for processing return codes received from the receiver nodes to determine a respective status of the requested transaction at each receiver node.

17. A computer program product having a non-transitory computer readable storage medium operable to store computer program logic embodied in computer program code encoded thereon for managing a distributed storage system comprising a plurality of data nodes each enabled to be at respective times either a receiver node or a sender node, the computer program code comprising:

computer program code for receiving, at receiver data node as a receiver node, a request from a sender node for a local priority message comprising an identifier (ID) for the receiver node and a generation value indicative of a version number of the file as stored on the receiver node;

computer program code for designating a state of the data node as a receiver node as controlled by the receipt at the data node of the request from the sender node for the local priority message, the sender node designated as the sender node as controlled by receipt by the sender node of a transaction request from a client relating to a file stored in the distributed storage system;

computer program code for sending the local priority message to the sender node;

computer program code for receiving a global priority message from the sender node, including the requested transaction and a global priority value determined at the sender node as a maximum generation value among the generation values received in the local priority messages received from the receiver nodes and indicative of a most up-to-date version of the file as stored among the nodes in the distributed storage system;

computer program code for processing the global priority message to update copies of the file stored in the distributed storage system by applying the requested transaction and incrementing a generation value counter for the file to indicate a new most up-to-date generation of the file as stored in the distributed storage system; and computer program code for sending a return code to the sender node indicative of a status of the requested transaction at the receiver node.

18. A distributed storage system comprising:

a plurality of data nodes each enabled to be at respective times either a receiver node or a sender node;

a first data node among the plurality of data nodes, designated as the sender node as controlled by receipt by the first data node of a transaction request from a client relating to a file stored in the distributed storage system, configured to send respective requests from the sender node to each data node of the plurality of data nodes other than the first data node as a receiver node for a local priority message comprising an identifier (ID) for the receiver node and a generation value indicative of a version number of the file as stored on the receiver node, determine a global priority value for the requested file as a maximum generation value among the generation values received in the local priority message received from the receiver nodes and indicative of a most up-to-date version of the file as stored among the nodes in the distributed storage system, send a global priority message, including the global priority value and the requested transaction, to each receiver node from which the sender node received a local priority message, the global priority message for processing at each receiver node to update copies of the file stored in the distributed storage system by applying the requested transaction and incrementing a generation value counter for the file to indicate a new most up-to-date generation of the file as stored in the distributed storage system, and process return codes received from the receiver nodes to determine a respective status of the requested transaction at each receiver node; and one or more other nodes among the plurality of data nodes designated as receiver nodes as controlled by the receipt at the data node of the request from the sender node for the local priority message, the other data nodes of the plurality of data nodes other than the sender node being designated as the receiver nodes upon receipt of a request from a sender node for a local priority message comprising the ID for the receiver node and a generation value indicative of a version umber of the file as stored on the receiver node, send the local priority message to the sender node, receive the global priority message from the sender node, including the requested transaction and the global priority value determined at the sender node as the maximum generation value among the generation values received in the local priority messages received form the receiver nodes and indicative of a most up-to-date version of the file as stored among the nodes in the distributed storage system, process the global priority message to update copies of the file stored in the distributed storage system by applying the requested transaction and incrementing a generation value counter for the file to indicate a new most up-to-date generation of the file as stored in the distributed storage system, and send a return code to the sender node indicative of a status of the requested transaction at the receiver node.

19. The system of claim 18 wherein the sender node is further configured to request a local priority message from each receiver node in a view of the plurality of data nodes, each local priority message comprising a receiver node identifier (ID) and a generation value associated with the file stored on the respective receiver node; send a global priority message, including a global priority value and the requested transaction, to each receiver node; and process return codes from each receiver node to determine a respective status of the requested transaction at each receiver node.

20. The system of claim 19 wherein the sender node receives a local priority message from a subset of the view of the plurality of data nodes and wherein the sender node is further configured to send the global priority message, including a global priority value and the requested transaction, to each receiver node, the global priority value determined by the sender node as the maximum local priority message, to each receiver node in the subset of the view of the plurality of data nodes.

21. The system of claim 20
wherein each receiver node in the subset of the view of the plurality of data nodes is further configured to send an identification of the nodes in the view and the availability status of each receiver node; and
wherein the sender node is further configured to cancel the requested transaction if a number of receiver nodes in the subset of receiver node is less than a majority of the number of receiver nodes; set a recovery trigger if a recovery flag is set in a received local priority message to indicate that receiver node requires recovery; and set the recovery trigger if a local priority message was received from a receiver node previously unavailable among the receiver nodes.

22. The system of claim 19 wherein the sender node is further configured to receive a respective return code from each receiver node in a subset of the view of the plurality of data nodes indicative of success of the transaction at the respective receiver node; process the return codes to determine the status of the requested transaction at each receiver node in the subset of the view; and send an acknowledgement to the client indicating success of the update to the file stored in the distributed storage system according to the processed return codes.

23. The method of claim 22 wherein the sender node is further configured to set a recovery trigger if the return codes indicate the requested transaction did not succeed at all of the receiver nodes in the subset of the view; set the recovery trigger if a replay request is included in a return code, including a generation value associated with the file at the receiver node that sent the return code; set the recovery trigger if the generation value included in the return code indicates the receiver node is not current when compared to the sender node and the sender node is in a majority of generation values; and set the recovery trigger if the generation value of the sender node is not in a majority of generation values.

24. The system of claim 19 wherein the sender node is further configured to detect a recovery trigger including a generation value for a receiver node that generated the recovery trigger; search a transaction history for a transaction associated with the generation value included in the recovery trigger; and send the associated transaction from the transaction history to the receiver node that generated the recovery trigger if the search succeeds.

25. The system of claim 24 wherein each generation value includes an incremented count of transactions processed at the respective receiver node and an identifier of the state of the file stored at the receiver node.

26. The system of claim 24 wherein the sender node fails to locate a transaction associated with the generation value included in the recovery trigger, indicating that the receiver node is current or is too far out of date to be recovered by transactions stored in a recovery cache of the sender node, and wherein a replay request is included in a return code, the sender node further configured to send a start copy request to the receiver node that generated the recovery trigger to initiate copying the file to the receiver node that generated the recovery trigger; receive an acknowledgment to the start copy request from the receiver node that generated the recovery trigger; and send the file to the receiver node that generated the recovery trigger.

27. The system of claim 19 wherein each receiver node is further configured to receive a start copy request, including the generation value of the sender node, to initiate copying the file from the sender node; send a return code if the generation value of the sender node matches the generation value of a receiver node in the view performing the method; send a copy request to the sender node if the generation value of the sender node does not match the generation value of the receiver node; and receive a copy of the file from the sender node.

28. The system of claim 18 wherein each receiver node is configured to process a request priority message received from the sender node; process a global priority message including the requested transaction, the global priority message received from the sender node; and apply the requested transaction.

29. The system of claim 28 wherein each receiver node is further configured to receive the request priority message for a local priority value associated with the file; increment a counter in a generation value; create an entry in a data structure referenced by a local priority in the generation value; reserve the entry for the requested transaction; and send a local priority message, including the local priority value, to the sender node.

30. The system of claim 28 wherein each receiver node is further configured to update the local priority value to equal the global priority value and setting its type to global; and send a return code indicative of success of the transaction to the sender node.

31. The system of claim 30 wherein each receiver node is further configured to sort received global priority values and local priority values in a list;
  if the first entry in the list includes a local priority value or no entry in the list includes a global priority value, then wait a specified period of time to receive a global priority value; and set a recovery trigger if no global priority value is received during the specified period of time; and
  if the first entry in the list includes a global priority value, commit the requested transaction; remove the global priority value from the list; and update a local view of nodes among a plurality of nodes in the distributed storage system according to an updated identification of the nodes in the view and the availability status of each receiver node included in the global priority message.

32. The system of claim 31 wherein each generation value includes an incremented count of processed transactions and an identifier of the state of the file and the receiver node is further configured to generate an updated generation value by calculating the identifier; and include the updated generation value in the return code.

\* \* \* \* \*